UNITED STATES PATENT OFFICE.

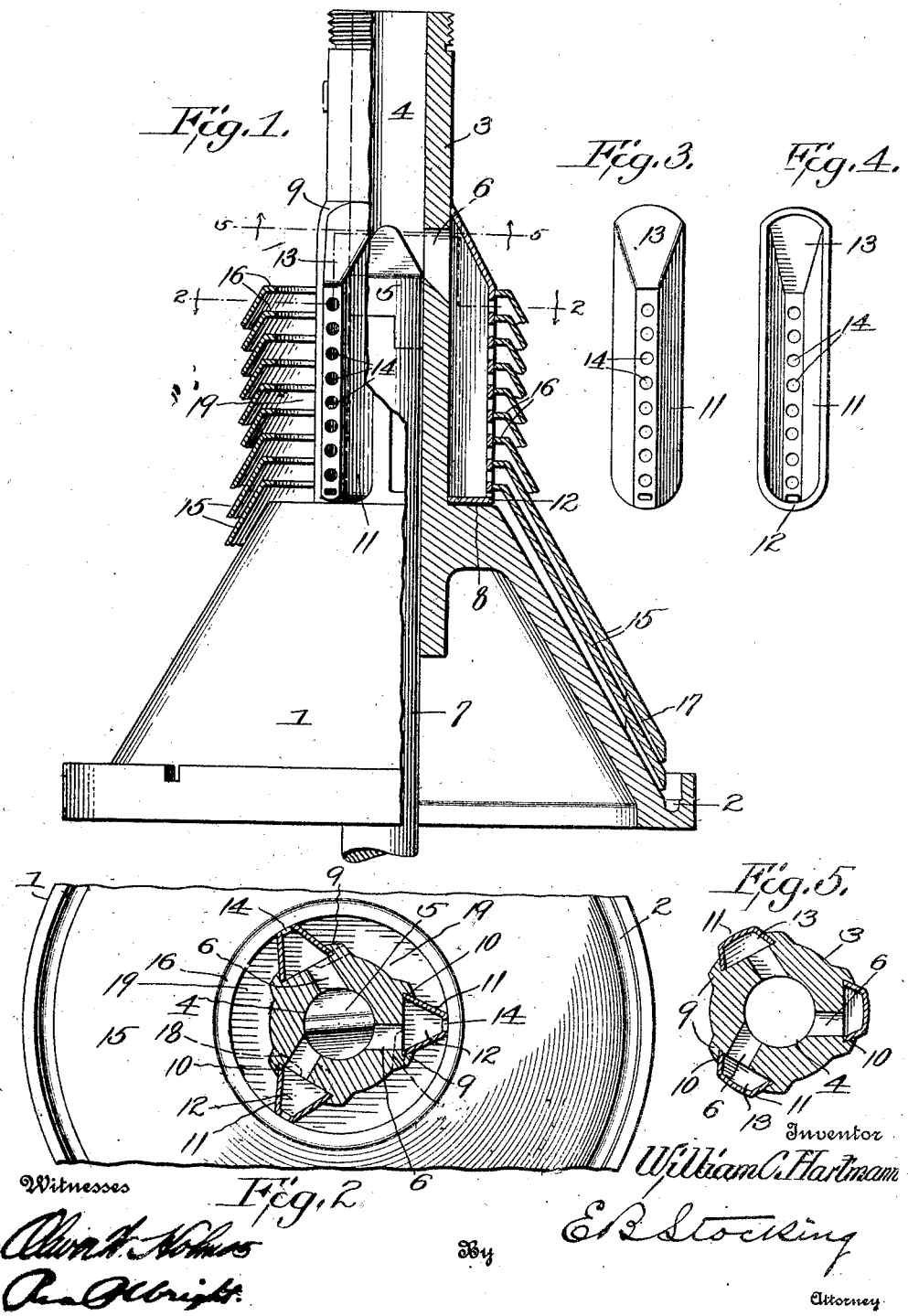

WILLIAM C. HARTMANN, OF MILWAUKEE, WISCONSIN, ASSIGNOR TO THE MILWAUKEE SEPARATOR COMPANY, OF MILWAUKEE, WISCONSIN, A CORPORATION OF WISCONSIN.

DETACHABLE DISTRIBUTER FOR CREAM-SEPARATORS.

1,002,914.     Specification of Letters Patent.     Patented Sept. 12, 1911.

Application filed January 23, 1911. Serial No. 604,211.

*To all whom it may concern:*

Be it known that I, WILLIAM C. HARTMANN, a citizen of the United States, residing at Milwaukee, county of Milwaukee, State of Wisconsin, have invented cert in new and useful Improvements in Detachable Distributers for Cream-Separators, of which the following is a specification, reference being had therein to the accompanying drawing.

This invention relates to certain new and useful improvements on my cream separator, patented July 19, 1910, No. 964,643, the object being to provide detachable milk distributers whereby the distributers can be easily and quickly removed in order to clean the same, thereby overcoming the difficulties now existing with the integral channels as shown in my former patent.

Another object of the invention is to improve the general construction and to provide a cream separator which will be very efficient and sanitary in use.

Another object of my invention is to provide a cream separator in which the milk receiving chamber is formed with guides to receive the distributers whereby the same will be held firmly in position when in use and at the same time can be readily drawn upwardly for detaching the same to facilitate the cleaning thereof.

Other and further objects and advantages of the invention will be hereinafter set forth and the novel features thereof defined by the appended claims.

In the drawing—Figure 1 is a vertical transverse section partly in elevation of my improved cream separator; Fig. 2 is a horizontal section taken on line 2—2 of Fig. 1; Fig. 3 is a front view of one of the distributers detached; Fig. 4 is a rear view of the same; and Fig. 5 is a section taken on line 5—5 of Fig. 1.

Like numerals of reference refer to like parts in the several figures of the drawing.

In the drawing, 1 indicates a conical base having the usual annular channel 2 and provided with an integral upwardly projecting tubular spindle 3, the upper portion of which forms a milk receiving chamber 4, its bottom being formed by a plug 5 having a wedge shaped point forming a deflector in order to force the milk out of the respective outlet openings 6 which are provided with beveled bottoms as clearly shown. The lower end of the plug 5 is notched and adapted to receive the notched end of a driving shaft 7 whereby the base can be readily removed therefrom in the usual manner.

An annular shoulder 8 is formed by the spindle on the top of the base and said spindle is provided with vertical ribs 9 in which are formed longitudinal V-shaped grooves 10 which terminate at their lower ends at the shoulder 8 which forms a support for distributers 11 mounted within said grooves. The distributers 11 are substantially V-shaped in cross section and are provided with square lower ends 12 and oblique upper ends 13, the edges of which fit snugly around the spindle 3. The distributers are provided with a series of outlet openings 14 spaced apart, as clearly shown, and around which are arranged a series of truncated milk separating cones 15 having horizontal upper portions 16 which gradually decrease in width in respect to each other from the top to the bottom, as clearly shown. The lower margins of the cones are provided with ribs 17 for spacing said cones apart and for forming outlets for the milk which is discharged through said outlets in small streams by centrifugal force.

The spindle 3 is provided with air ducts 18 extending into the outlets 6 at substantially right angles thereto, through which air is adapted to be forced by the rotary motion of said spindle so as to impart an impulse to the milk passing through the outlets into the distributers in such a manner that the milk entering the distributers will be discharged therefrom through the openings with great velocity between the respective separating cones, the milk being forced downwardly between the cones and the cream, by centrifugal force, being drawn centrally and upwardly through the openings 19 in the usual manner.

From the foregoing description, it will be seen that I have provided a cream separator which is exceedingly simple and cheap in construction in which the milk from the receiving chamber is delivered into distributers so mounted and arranged that the milk will be distributed equally between the respective separating cones. It will also be seen that the distributers carrying the cones are so mounted in respect to the base and spindle that they can be readily separated so as to allow the parts to be thoroughly cleaned thereby forming a very sanitary machine.

Having described my invention and set forth its merits, what I claim and desire to secure by Letters Patent is—

1. A cream separator having a milk receiving chamber provided with outlets, and detachable distributers arranged over said outlets.

2. A cream separator comprising a milk receiving chamber having outlets, a deflector arranged within said chamber, and distributers arranged over said outlets, said distributers being capable of moving vertically.

3. A cream separator comprising a tubular spindle having a milk receiving chamber at its upper end, said chamber being provided with outlets, and slidably mounted distributers arranged over said outlets.

4. A cream separator comprising a milk receiving chamber having outlets at its lower end, slidably mounted distributers arranged over said outlets, and a series of milk separating cones carried by said distributers.

5. A cream separator comprising a base having a tubular spindle provided with vertical ribs having longitudinal V-shaped grooves, and V-shaped distributers slidably mounted in said grooves resting on said base.

6. In a cream separator, a milk receiving chamber having outlets, a distributer arranged within said chamber, removable distributers arranged over the outlets of said chamber, said distributers being provided with a series of openings, and a series of separating cones arranged over said distributers.

7. In a cream separator, the combination with a base, of a spindle mounted on said base provided with vertical ribs having longitudinal grooves, said spindle being provided with a milk receiving chamber having outlets communicating with said grooves, and substantially V-shaped distributers mounted in said grooves having oblique upper ends.

8. In a cream separator, a revoluble spindle having a milk receiving chamber provided with outlets, said spindle being provided with air ducts extending into said outlets, and milk distributers detachably mounted on said spindle over said outlet openings.

9. In a cream separator, a base, a spindle extending centrally therefrom, having longitudinal ribs provided with V-shaped grooves, a plug fixed in said spindle, said spindle being provided with openings communicating with said grooves, said openings having air ducts communicating therewith, and detachable distributers slidably mounted in said grooves carrying separating cones.

10. In a cream separator, the combination with a hollow spindle having vertical grooved ribs, of hollow distributers slidably mounted in the grooves of said ribs, and a deflector arranged within said spindle.

11. In a cream separator, the combination with a tubular spindle provided with vertical ribs having longitudinal grooves, said ribs having outlet openings and air ducts, and distributers mounted in the grooves of said ribs.

12. A cream separator having a tubular spindle provided with grooved ribs, said ribs having outlet openings provided with air ducts, hollow distributers arranged in the grooves of said ribs, and cones carried by said distributers.

In testimony whereof I affix my signature in presence of two witnesses.

WILLIAM C. HARTMANN.

Witnesses:
E. HENRY T. DANIELS.
EDWARD MCGINNIS.